United States Patent [19]

Morikawa et al.

[11] Patent Number: 5,725,400
[45] Date of Patent: Mar. 10, 1998

[54] CONNECTING TERMINAL SECTION STRUCTURE

[75] Inventors: Seiichi Morikawa, Chiba; Naoyuki Ono; Taketo Takata, both of Tokyo, all of Japan

[73] Assignees: SMK Co., Ltd.; Sony Corporation, both of Tokyo, Japan

[21] Appl. No.: 664,015

[22] Filed: Jun. 12, 1996

[30] Foreign Application Priority Data

Jun. 12, 1995 [JP] Japan ................... 7-167885

[51] Int. Cl.$^6$ ................................ H01R 4/02
[52] U.S. Cl. .................. 439/874; 29/860; 174/74 R; 228/165; 439/607
[58] Field of Search ................. 439/874, 876; 228/165, 179.1; 29/857, 860; 174/84 R, 74 R, 94 R, 77 R, 76

[56] References Cited

U.S. PATENT DOCUMENTS

| | | | |
|---|---|---|---|
| 3,665,367 | 5/1972 | Keller et al. | 439/866 |
| 4,717,354 | 1/1988 | McCleerey | 439/874 |
| 4,972,989 | 11/1990 | Black et al. | 228/179.1 |

*Primary Examiner*—Neil Abrams
*Assistant Examiner*—T. C. Patel
*Attorney, Agent, or Firm*—Lowe, Price, LeBlanc & Becker

[57] ABSTRACT

The terminal portion 83 of a contact 82 is of a groove type, with a larger diameter than the lead wire diameter, and includes small holes 84 drilled and installed in the bottom of the groove. By such a construction, when the solder 19 flows in between the terminal portion 83 and the lead wire by the surface tension, the air between the terminal portion 83 and the lead wire discharges through the small holes 84, thus preventing formation of an air layer between the terminal portion 83 and the lead wire. The holes 84 permit solder to enter the holes to discharge the air, but are sufficiently small to prevent solder from flowing therethrough and dripping out of the groove. By observing whether or not the solder has flowed into the small holes 84 it is possible to confirm whether the solder has entered the clearance between the lead wire and the terminal.

11 Claims, 7 Drawing Sheets

Fig. 4
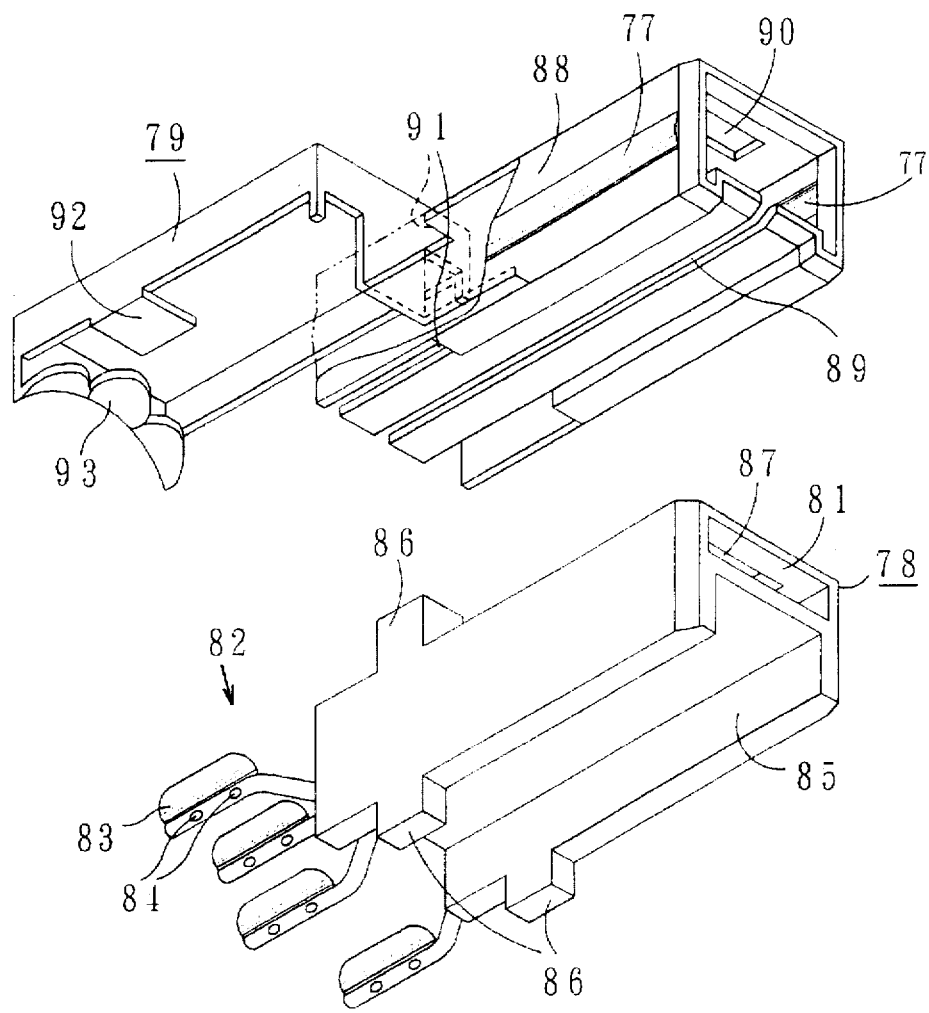
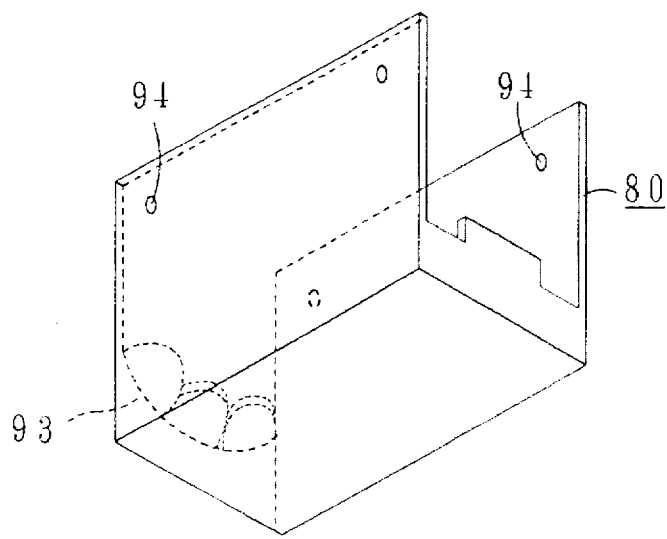

Fig. 7 PRIOR ART
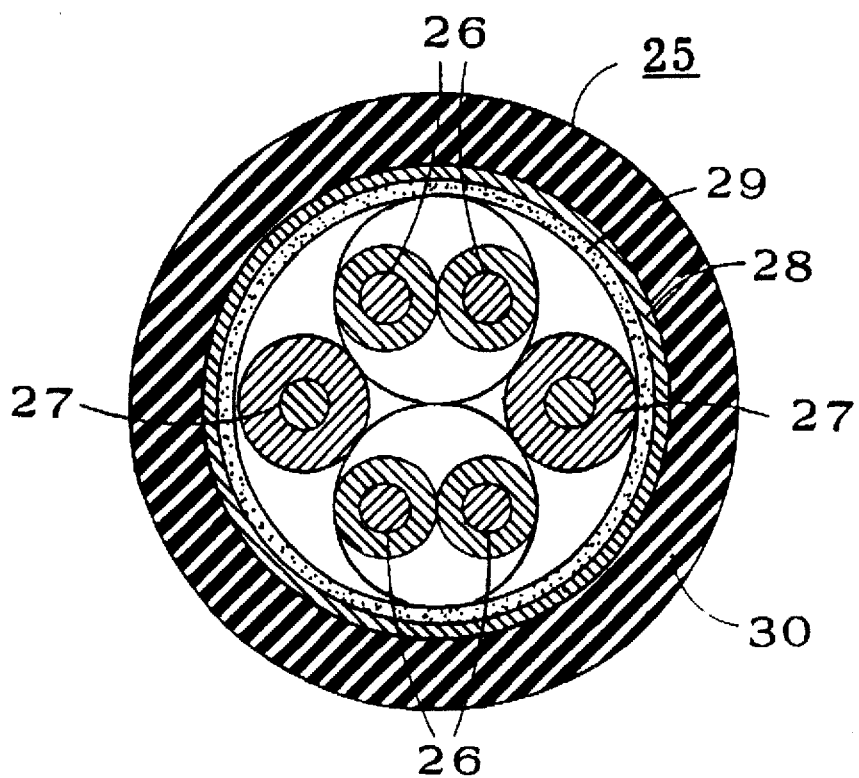
Fig. 8 (a) PRIOR ART
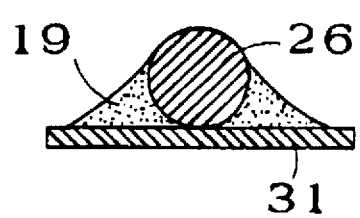
Fig. 8 (b) PRIOR ART
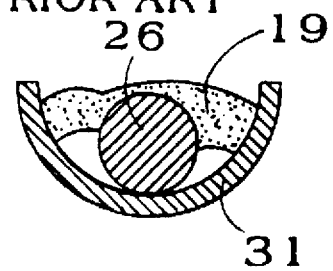

CONNECTING TERMINAL SECTION STRUCTURE

BACKGROUND OF THE INVENTION

1. Field of the Invention

This invention relates to a connecting terminal portion construction in a contact-like connector plug connected to an edge of a VTR connecting cord and the like.

2. Description of the Prior Art

In general, as shown in FIG. 9, a connector 10 is composed of a connector socket 12 installed at a body chassis side and a connector plug 11 mounted at the edge of a cable 25.

The connector plug 11 has plural contacts 23 installed to an inside opening of the front of a housing 22, and the outer periphery of the housing 22 is covered by an angular cylindrical metal shell 32. The plural contacts 23 are connected to each signal conductor and power line of the cable 25, and this connecting portion is covered with a cover 24.

The connector socket 12 is fixedly mounted with screws 20 at the edge of a wiring plate 14, and the terminal portion of a terminal 18 is connected to a conductive foil 21 by the solder 19. Moreover, the socket is mounted by inserting a socket fitting 16 of the connector socket 12 into a through hole 15 of the chassis 13 and facing the opening portion of the socket fitting 167 to the outside.

When inserting the connector plug 11 into the connector socket 12 as mentioned above, metal shell 32 is fitted to the socket fitting 16, and the contact 23 is in contact with the contact portion of the terminal 18, and is electrically connected thereto.

For a terminal portion 31 of the contact 23 in the conventional connector plug 11, a flat-board shape as shown in FIG. 8(a) and a semi-cylindrical shape as shown in FIG. 8(b), etc. have been used.

Terminals of a flat-board shape as shown in FIG. 8(a) have advantages that can confirm the application condition of a solder 19 as seen from above. However, even though it is desired to place a lead wire-like signal conductor 26, etc. just in the middle of the terminal portion 31, positional deviation occurs easily at the time of soldering. Moreover, since the contacts 23 used presently are thin, and since mutual intervals thereof have been made narrow, there is a possibility that a short-circuit may occur with an adjacent terminal portion 31 as the flat board remains left.

Terminals having a semi-cylindrical shape as shown in FIG. 8(b) have advantages that, even though a lead wire-like signal conductor 26, etc. is placed just in the middle of the terminal portion 31, the positional deviation does not occur and, further, even if the mutual intervals between the contact 23 are narrow, it is difficult to short-circuit with the adjacent terminal portion 31. However, when placing the solder 19, because the spacing between the signal conductor 26 and the terminal portion 31 is narrow adhesion with the solder 19 is bad, and there is thus a problem in that the quality of the solder adhesion cannot be confirmed when an air layer is trapped in this part, causing a defective connection.

BRIEF SUMMARY OF THE INVENTION

The object of this invention is to improve the soldering intensity by making the soldering area as large as possible and/or pulling the solder by means of the surface tension in the connecting place.

This invention solves this object and provides a connecting terminal portion structure to connect the lead wire to a terminal portion 83 of a contact 82 by the solder 19, wherein the terminal portion 83 is of a groove type with a diameter which is slightly larger than the lead wire diameter, and wherein a small hole 84 is drilled and installed to an extent in the bottom portion of the groove of this terminal portion 83, so that the molten solder 19 spontaneously flows in by surface tension, but does not flow out downward.

In such a construction, the lead wires are placed one after another on the terminal portion 83 of the contact 82. At this time, the solder 19 flows in by the surface tension between the terminal portion 83 and the lead wire, but since the air near the terminal portion 83 comes out from the small hole 84, without trapping an air layer between the terminal portion 83 and the lead wire, the solder 19 flows into the small hole 84. Since the small hole 84 is small, whenever the air passes therethrough, the solder 19 flows without resulting in drip therebelow. The inventive structure permits confirmation of whether or not the solder 19 surely gets into a clearance, or whether or not the solder 19 flows also in the small hole 84, by judging the results from the bottom face of the terminal portion 83.

Other objects of the invention will become more apparent in the detailed description and example which follows.

BRIEF DESCRIPTION OF THE DRAWINGS

FIG. 4 is an exploded perspective drawing of a connector plug;

FIG. 7 is a cross-sectional view of a cable;

FIG. 8(a) is a cross-sectional view showing the connecting condition of a terminal portion in a flat-board shape;

FIG. 8(b) is a cross-sectional view showing the connecting condition of a terminal portion in a groove-type shape.

DETAILED DESCRIPTION

An embodiment of this invention will be explained on the basis of FIG. 1 to FIG. 6.

Figure 3:
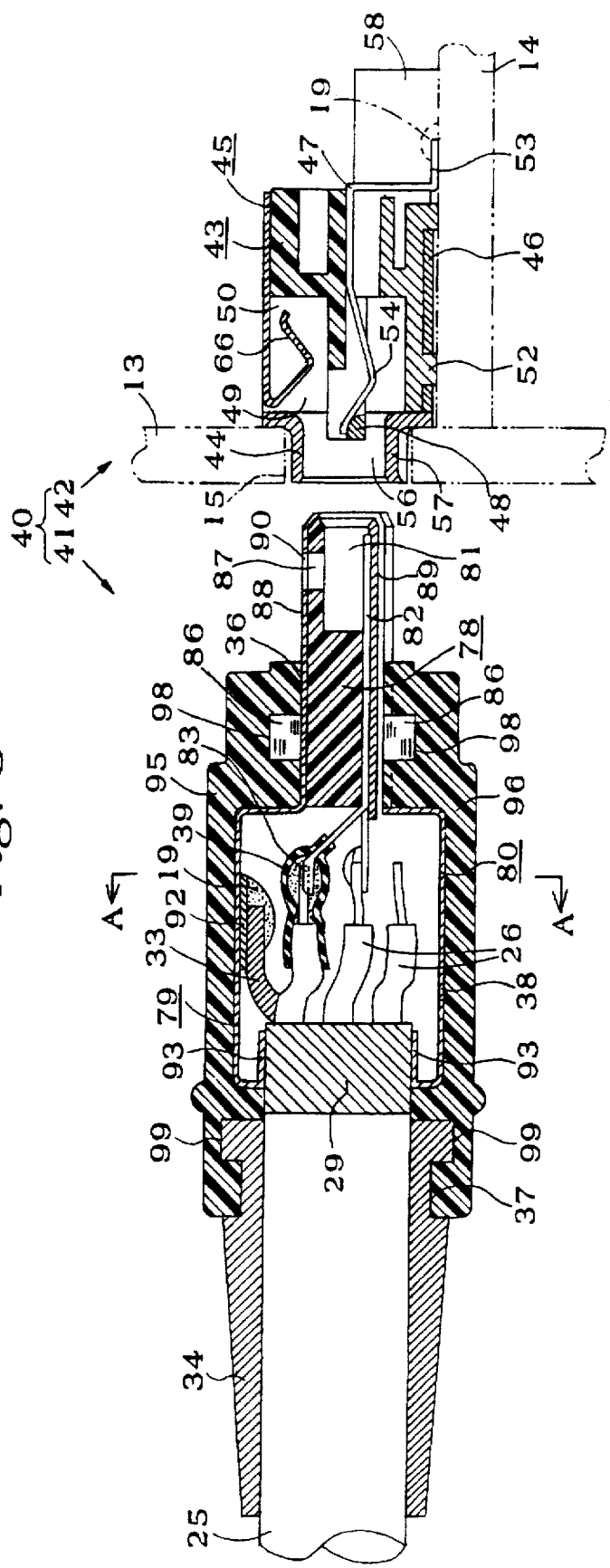
FIG. 3 is a cross-sectional view of a connector socket and connector plug.

As shown in FIG. 3, the numeral 40 is a connector invention, and this connector 40 is composed of a connector plug 41 and a connector socket 42.

Figure 2A:
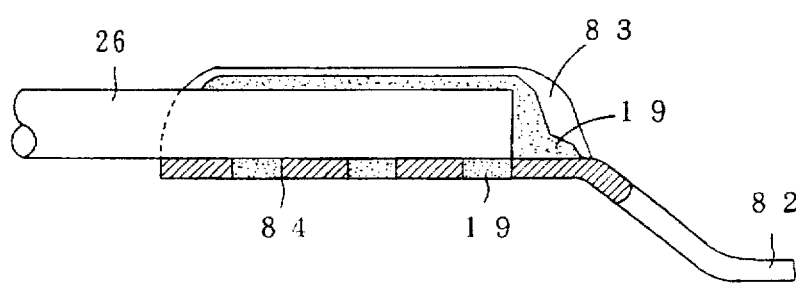
FIG. 2(a) is a longitudinal front elevation to show connection of the lead wire to the connecting terminal portion in the contact of the present invention.
Figure 2B:
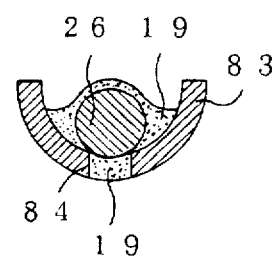
FIG. 2(b) is a longitudinal side view of FIG. 2(a)
Figure 5:
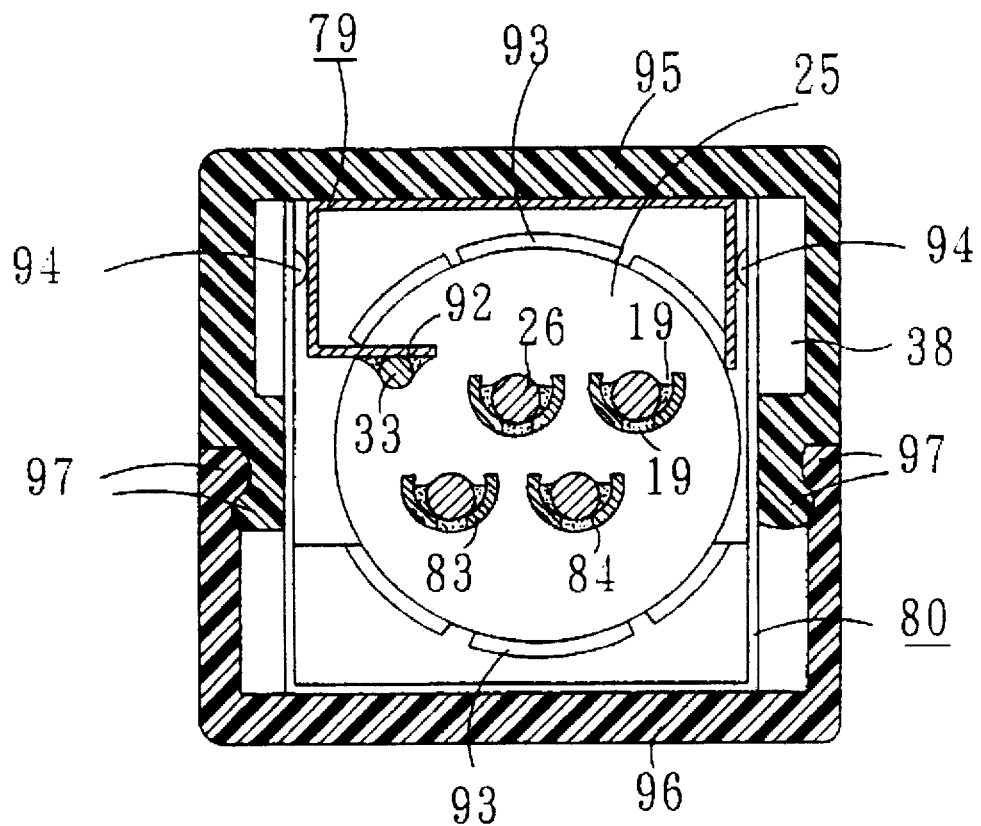
FIG. 5 is a cross-sectional view taken along section line A—A in FIG. 3.
Figure 6:
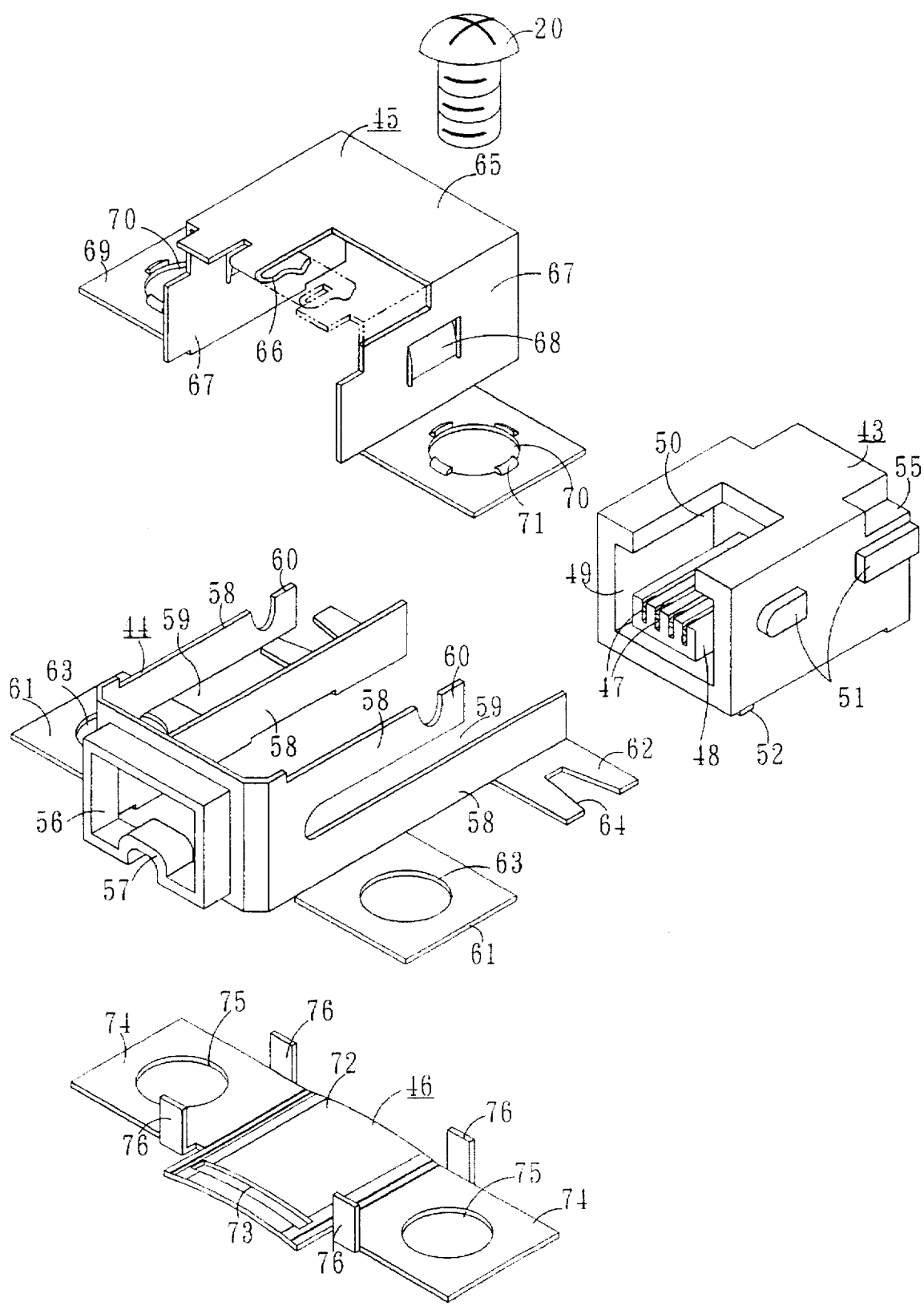
FIG. 6 is an exploded perspective drawing of a connector socket according to the present invention.
Figure 9:
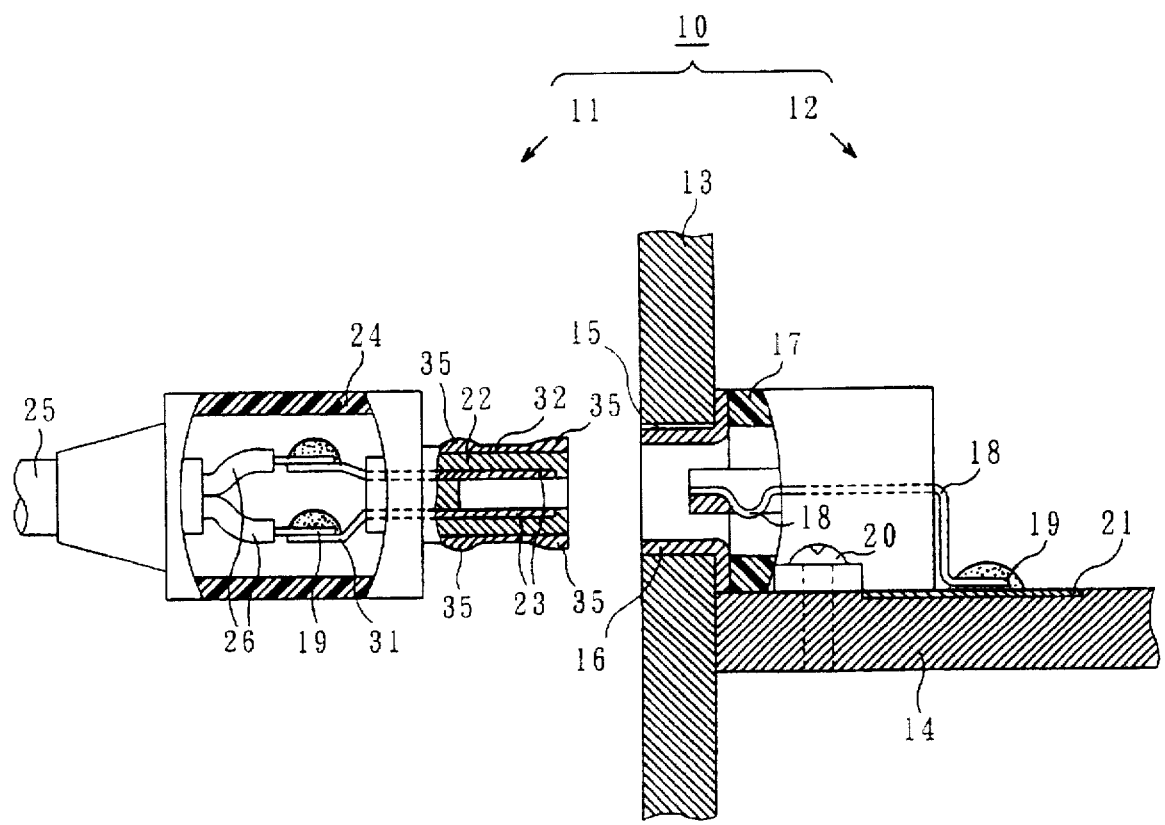
FIG. 9 is a cross-sectional view of the conventional connector plug and connector socket.

The connector plug 41 is composed of a housing 78 made of insulating resin, an upper shield case 79 composed of the conductive metal plate, the same as a lower shield case 80 composed of the conductive metal plate as shown in the exploded perspective drawing in FIG. 4, an upper cover 95 made of insulating resin as shown in FIGS. 2 and 5, and a lower cover 96 made of insulating resin.

The housing 78 includes at an opening thereof a socket engaging hole 81 in the front, as well as a bottom groove 85 in the longitudinal direction in the bottom face. Moreover, a half locking hole 87 is drilled and installed in the top face, and slip-out projections 86 project vertically in the rear. The frontal edge is chamfered.

Moreover, in the housing 78, at the socket engaging hole 81, ends of plural contacts 82 are faced. The structure is designed in such a way that the other end of the contact 82 will be slipped out backward, and is molded into one piece. A terminal portion 83 is formed in the portion slipped out backward of this contact 82.

Figure 1A:
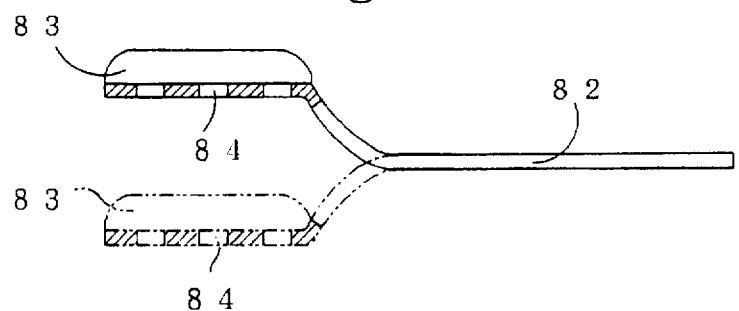
FIG. 1(a) is a longitudinal front view showing an embodiment of the connecting terminal portion construction in the contact of this invention.
Figure 1B:
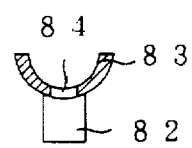
FIG. 1(b) is a longitudinal side view of FIG. 1(a)

This terminal portion 83 is, as shown in FIGS. 1(a) and (b), a semi-circular shape with a little larger diameter than a signal conductor 26 to be connected, and in the bottom of this terminal portion 83, the small holes 84 have been drilled and installed, of size such that the molten solder 19 flows in spontaneously but does not flow out downwardly specifically, if the diameter of the signal conductor 26 is 0.3 mm, the diameter of the semi-circular portion of the terminal portion 83 should be approximately 1.0 mm, and the diameter of the small hole 84 is of approximately 0.3 mm. Since the plural terminal portions 83 have narrow intervals (with continuous lines and chain lines shown in FIG. 1 in the neighborhood, it is desirable that they remain folded alternately up and down, and folded in zigzag.

Further, the terminal portion 83 is not limited to having a groove type of a semi-circular shape. Terminal of a V type, a U type, an upward "]"-letter type, etc. may be used.

The upper shield case 79 forms a one-piece metal shell portion 88 in the front edge. Since this metal shell portion 88 inserts into the housing 78 from behind, the whole structure is substantially prismatic, but the bottom is folded over in a little groove type to be fitted to the bottom groove 85. In this bottom, a slit 89 is provided for the escape when the metal shell portion 88, which itself has elasticity, is formed with clearance in the length direction (direction of insertion of the connector plug 41.

As shown in FIG. 4, an elastic portion 77, which bulges out to both side portions of the metal shell portion 88, is installed in the longitudinal direction (direction of insertion of the connector plug 41). And then, in case this metal shell portion 88 is fitted to the connector socket 12, the whole metal shell portion 88 is elastically press-contacted to the engagement portion 56 of the shield case 44 by deformation of the elastic portion 77. At this time, the slit 89 is made the escape.

On the upper plate of the metal shell portion 88, a half locking hole 90 is drilled, or on the upper plate and lower plate, a notch 91 is formed so that the slip-out projections 86 will protrude therethrough.

The back end portion of the upper shield case 79 is of a shallow lid-type by having upper plate and side plates in four directions, and includes in one piece a semi-circular portion 93 folded over to the inside from the back end and a side plate connecting terminal portion 92 folded over to the inside from the lateral direction.

The lower shield case 80 forms a box type without lid by the base plate and side plates in four directions contrary to the upper shield case 79, and forms into one piece the semi-circular portion 93 folded over to the inside from the side plate at the back end. On the right and left side plates thereof, the plural projections 84 are provided to assure the contact with the upper shield case 79 are projected in the internal direction and formed.

The upper cover 95 and lower cover 96, as shown in FIGS. 3 and 5 are of a shape which is horizontally divided into two to become substantially prismatic. Moreover, covers 95-96 include engaging portions 97 in the engaging portion at both respective sides, as well as angular holes 36 in the front, and round holes 37 in the back face. The structure also includes hollow portions 38 of the interior. Moreover, in the inner wall faces of both the angular holes 36 and the round holes 37, there are formed engaging grooves 98 and engaging grooves 99, respectively.

The order to assembly the connector plug 41 by each portion as above will be explained.

First, in the cable 25 installing the bushes 34 into one piece at the top, as shown in FIG. 3, the signal conductor 26 and a grounding wire 33 are exposed, a shield 29 is folded over to the outer circumference of an insulating jacket 30. Further, an insulating tube 39 is freely fitted to the signal conductor 26 and lets the process continue to the end.

Then, the signal conductors 26 are placed into the terminal portion 83 of the contact 82 one after the other and are connected by the solder 19. At this time, since the solder 19 flows in between the terminal portion 83 and the signal conductor 26 by the surface tension, and the air between the terminal portion 83 and the signal conductor 26 discharges from the small hole 84, the air layer is not formed between the terminal portion 83 and the signal conductor 26, and the solder 19 flows into the small hole 84. Since the small hole 84 is as small as approximately 0.3 mm in diameter, the air passes therethrough. Moreover, by confirming from the bottom face of the terminal portion 83 whether the solder 19 has flown into the small holes 84, it is possible to judge whether or not the solder 19 has satisfactorily flowed into the clearance. After the signal conductor 26 is connected to the terminal portion 83, by carrying the insulating tube 39 till the connecting portion and heating it, the insulating tube 39 is thermally shrunk and closely adhered to the signal conductor 26 or the terminal portion 83, which are thus protected from the short-circuit and disconnected.

The housing 78 connected to the signal conductor 26 is inserted from the back end into the metal shell portion 88 of the upper shield case 79, and press-fitted until the slip-out projections 86 will be properly connected to the notch 91. The grounding wire 33 is then connected to the connecting terminal portion 92 by the solder 19.

As shown in FIG. 5, the lower shield case 80 is then fitted to the upper shield case 79. At this time, the shield 29 is folded over to the outside of the insulating jacket 30 and is in contact with the semi-circular portion 93 of the upper shield case 79 and the semi-circular portion 93 of the lower shield case 80. The projection 94 of the lower shield case 80 is press-connected to the side plate of the upper shield case 79. Moreover, the upper cover 95 is covered to the upper shield case 79, the lower cover 96 is covered to the lower shield case 80, and the upper and lower engaging portions 97 are press-fitted and engaged. Then, the slip-out projection 86 is fitted to the engaging groove 98, and the upper case 29 and the lower shield case 80 are fitted to the hollow portion 38. The point of a bush 34 is fitted to the engaging groove 99, the point of the metal shell portion is protruded from the angular hole 36, and the assembly of the connector plug 41 is completed.

The details of the connector socket 42 will be explained by reference to FIGS. 3 and 4.

Connector socket 42 is composed of a housing 43 made of insulating resin. A shield case 44 is made of the conductive metal plate, an upper lid of the shield 45 is made of the conductive metal plate and the shield base plate 46 is made of the conductive metal plate.

The housing 43 protrudes and a terminal receiving portion 48 is fitted to the connector plug 41 at a front opening 49. The plural terminals 47 are arranged at determined intervals at a terminal receiving portion. The top face of this terminal 47 is made a contact portion 54 by protruding a little from downward of the terminal receiving portion 48. On the other hand, the other edge of the terminal protrudes from the back portion of the housing 43, resulting in the terminal portion 53.

In the upper plate part of this housing 43 a top face notch 50 is formed from the front edge, and in the side plate portion, two pieces of convex mating portion 51 are horizontally formed with clearance for an engaging click 68 described below. Moreover, in the back end angular portion, an engaging convex portion 55 is formed, and in the bottom a positioning projection 52 is formed.

The shield case 44 forms the engaging portion 56 in the center by the drawing of the conductive metal plate, and possesses an inserting direction determining projection 57 in the bottom of this engaging portion 56. The side plate portion 58 is folded and formed backward from both sides of this engaging portion 56. A slit 59 is formed from the back edge in the side plate portion 58, and a tongue 60 is formed at the back upper edge of this side plate portion 58. Further, in the bottom of the side plate portion 58 a screw fastening piece 61 and the fixing piece 52 are folded and formed to the outside. In the screw fastening piece 61, a tapped hole 63 is formed, and in the fixing piece 62, a V-shaped notch 64 is formed.

Using a conductive metal place, the upper lid of the shield 45 is made by being folded in the downward "]" shape without bottom, the front edge part of an upper face portion 65 is folded by approximately 180 degrees into the inside and a half locking piece 66 is formed into one piece. Moreover, the engaging click 68 is cut up and formed to a side plate portion 67 at both sides, and further a screw fastening piece 69 is folded and formed outward in the bottom of a side plate portion 67. In this screw fastening piece 69, a tapped hole 70 is drilled and installed, and for reliability improvement at the time of screw drawing, the plural pieces of projection 71 are formed into one piece around the tapped hole 70.

The shield base plate 46 is composed of the long and narrow conductive metal plate upward. A positioning hole 73 is formed, a tapped hole 75 is drilled and installed in the screw fastening piece 74 into once piece at both ends. Moreover, an upwardly protruding caulking piece 76 is positioned between a concave bottom 72, and the screw fastening piece 74 forms the caulking piece 76 protruding upward.

Next, the assembly order of the connector socket 42 will be explained.

The housing 43 is fitted in such a way that the convex mating projection 51 is guided to the slit 59 from back of the shield case 44 and, after fitting, it is fixed by folding the tongue 60 into the fixing concave portion 55 side. Then, the terminal receiving portion 48 is faced to the front of the engaging portion 56.

Then, the upper lid of the shield 45 is covered from upward of the shield case 44. Then, the side plate portion 67 of the upper lid of the shield 45 is fitted slipping the outside of the side plate portion 58 of the shield case 44, and the engaging click 68 is fastened in the concave portion formed in the clearance between the slit 59 and two pieces of convex mating projection 51. At the same time the half locking piece 66 is freely engaged in the top face notch 50 of the housing 43, faced to the upper part of the terminal receiving portion 48, the tapped hole 63 is mated with the tapped hole 70, and the screw fastening piece 61 and the screw fastening piece 69 are overlapped.

Then, the shield base plate 46 is fitted in such a way that from the bottom face of the housing 43 the positioning hole 73 and the positioning projection 52 will be fitted. Then, first obtaining agreement with the tapped hole 75 of other screw fastening piece 74, three pieces of screw fastening pieces 74, 61 and 69 are closely adhered, and fixed by folding the top face of the caulking piece 76.

The connector socket 42 assembled in such a way fits the engaging portion 56 to the through hole 15 of the chassis, as well is placed on the specified position of the wiring plate 14, and is fixed with screws 20, and the fixing piece 52 is fixed by the solder. Moreover, the terminal portion 53 of the terminal 47 is connected by the solder 19.

When inserting the connector plug 41 constituted as mentioned above into the connector socket 42, the metal shell portion 88 of the upper shield case 79 is fitted to the engaging portion 56 of the shield case 44. At this time, no connector plug 41 is inserted in such a way that the bottom groove 85 will be fitted to the inserting direction determining projection 57, and no connector plug 41 is inserted by turning it over. When the metal shell portion 88 is inserted into the engaging portion 56, by the elastic portion 77, the whole metal shell portion 88 has elasticity, escape when the metal shell portion 88 is pressed inward, is absorbed by the drilled divisions 89, and the metal shell portion 88 and engaging portion 56 are surely adhered in a close manner.

Should the metal shell portion 88 be inserted further, the contact 82 is in contact with the contact portion 54 of the terminal 47 and is electrically connected for a certainty, otherwise, the half locking piece 66 of the upper lid of the shield 45 is fitted to the half locking hole 90 of the metal shell portion 88 and the half locking hole 87 of the housing 78, and the connector plug 41 is half locked to the connector socket 42.

When inserting the connector plug 41 into the connector socket 42, or slipping it out, even though an external force is applied in the direction intersecting the direction of insertion to the connector plug 41, since the connector socket 42 is not only fixed with screws 20, but is also fixed with fixing pieces 62 of the shield case 44, no terminal portion 53 of the terminal 47 is exfoliated, which withstands use for a long period of time.

The terminal portion 83 of the contact 82 of this invention is of groove type with a little larger diameter than the lead wire diameter, and one or more small holes 84 are drilled and installed in the bottom of the groove of this terminal portion 83. For this reason, without forming an air layer between the terminal portion 83 and the lead wire, the solder 19 flows into the small hole Since the small hole 84 is small, the air passes through and the solder 19 flows into the hole without resulting in flowing or dripping of the solder 19 below the hole, resulting in the lead wire being surely connected to the terminal portion 83 of the contact 82. Moreover, since the terminal portion 83 is of a groove type, there is no positional deviation of the lead wire, thus eliminating any fear of short-circuit with the adjacent terminal portion 31, thus improving more than the soldering intensity.

Further, it can be determined whether or not the solder 19 has surely gotten into fill the clearance by confirming from the lower face of the terminal portion 83 whether or not the solder 19 has also flown in the small hole 84.

What is claimed is:

1. A connecting terminal portion of a contact configured for connecting a lead wire to a terminal portion by a solder connection, the terminal portion having a groove, the groove having a diameter which is a little larger than a diameter of the lead wire, said terminal portion including at least one small hole therein to discharge air trapped in the solder connection and to enable molten solder to flow into a bottom of the groove spontaneously by surface tension, but not to flow out downwardly therefrom, wherein said groove includes a longitudinal opening along one portion thereof and said small hole is positioned opposite said longitudinal opening.

2. A connecting terminal portion as recited in claim 1 wherein the contact is installed in a housing of a connector plug, and the lead wire is composed of a signal conductor of the cable.

3. A connecting terminal portion as recited in claim 1, wherein said at least one small hole has a diameter of approximately 0.3 mm.

4. A connecting terminal portion as recited in claim 1, comprising a plurality of small holes, each positioned opposite said longitudinal opening.

5. A connecting terminal portion as recited in claim 1, wherein said groove forms a trough for the solder, said at least one small hole being positioned at a bottom of said trough and having an opening dimension sufficiently small to enable surface tension to prevent solder which enters said small hole by capillary action from flowing therethrough outwardly from said groove.

6. A connecting terminal portion as recited in claim 5, wherein said at least one small hole has a diameter of approximately 0.3 mm.

7. A connecting terminal portion of a contact for connecting a lead wire to a terminal portion by a solder connection, comprising:

an open trough shaped structure having a longitudinal opening for receiving the lead wire and for the solder, said opening having a dimension which is a little larger than a diameter of the lead wire, said opening including a small hole for discharging air from an air layer trapped in the solder connection, said small hole having a diameter sufficiently small to enable surface tension to prevent molten solder flowing into the hole from the groove from flowing through the hole to exit the trough shaped structure.

8. A connecting terminal portion of a contact for connecting a lead wire to a terminal portion by a solder connection, comprising:

an open trough shaped structure having a longitudinal opening for receiving the lead wire and for the solder, said opening having a dimension which is a little larger than a diameter of the lead wire, said opening including a small hole for discharging air from an air layer trapped in the solder connection, said small hole having a diameter sufficiently small to prevent molten solder from flowing into the hole from the groove from flowing through the hole to exit the trough shaped structure, wherein said small hole is at a bottom portion of said open trough opposing the longitudinal opening thereof.

9. A connecting terminal portion as recited in claim 8, comprising a plurality of small holes at the bottom portion of said open trough.

10. A connecting terminal portion as recited in claim 8, wherein said small hole has a diameter of approximately 0.3 mm.

11. A connecting terminal portion as recited in claim 10, wherein each of said plurality of small holes has a diameter of approximately 0.3 mm.

* * * * *